June 7, 1960  M. F. KEATHLEY, SR., ET AL  2,939,407
DEPOSITING MACHINE
Filed March 26, 1956
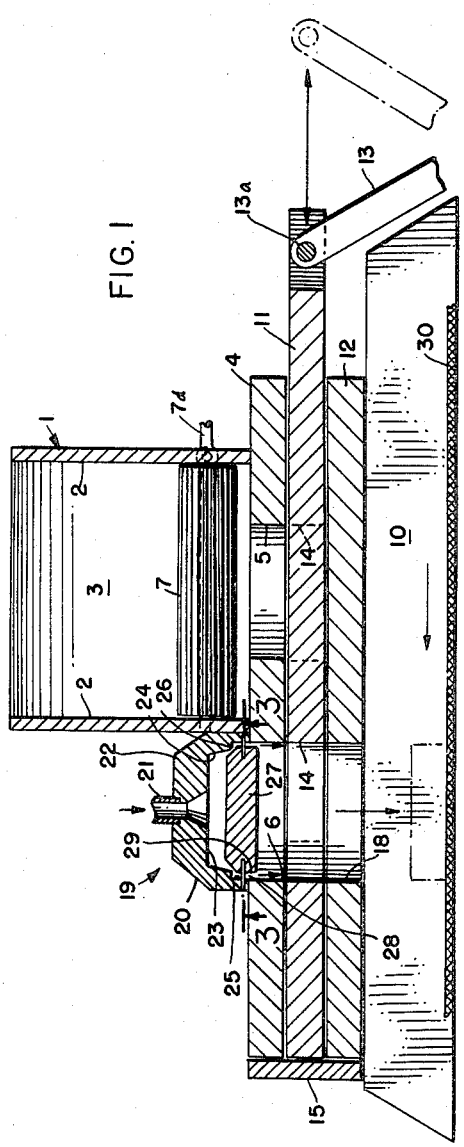
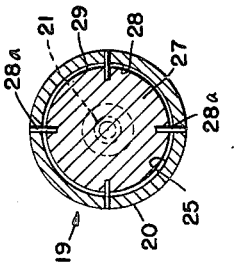
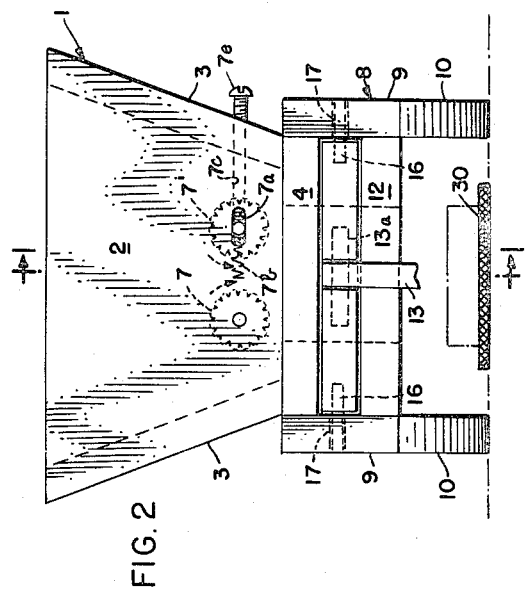
INVENTORS:
MAURICE F. KEATHLEY, SR
ROBERT O. MANSPEAKER
BY
ATT'YS

United States Patent Office 2,939,407
Patented June 7, 1960

2,939,407
DEPOSITING MACHINE

Maurice F. Keathley, Sr., 2271 Young Ave., and Robert O. Manspeaker, 1120 McNeil St., both of Memphis, Tenn.

Filed Mar. 26, 1956, Ser. No. 573,950

3 Claims. (Cl. 107—15)

This invention relates to a machine for depositing foodstuffs and, particularly, for measuring and molding foodstuffs and depositing the molded masses in pastry shells, receptacles, on pans, or on a conveyor, and for like depositing, filling and topping operations. The machine functions to measure or subdivide and mold plastic foodstuff masses, which may be in the form of particles or pieces, doughs or batters, viscous liquids, pastes, jellies, and so forth, and deposit them in the desired molded form containing the correct quantity of foodstuff material on receptacles, conveyors or onto other food products.

The depositing machine of the invention is of the type which includes a hopper, bin or reservoir which holds the foodstuff, and the foodstuff is supplied from the hopper to dies or molds which form the foodstuff in the desired configuration and in masses, pieces or increments containing the desired amount of material. From the molds, the foodstuff masses are deposited or discharged into or on the conveyors, containers or other food articles.

An object of the invention is to provide a new and improved depositing machine of the type described, which overcomes the disadvantages of prior constructions and provides substantial improvements in construction and operation. It is also an object to provide an improved method of forming foodstuffs into desired configurations and/or in measured amounts, and for depositing the molded or measured masses.

An important object is to provide a depositing apparatus which will feed the foodstuff work material in continuous fashion to the measuring and molding units in a simple and effective manner.

Another important object is to furnish an apparatus having improved means for depositing or discharging the subdivided masses of foodstuff. In particular, this object is accomplished in a very effective and trouble-free manner by the provision of meats for directing an air jet or blast against the pieces or molded masses to be deposited.

A further object is to provide an especially advantageous combination of apparatus which results in rapid and reliable depositing and filling operations and is especially well adapted for economy of operation, without need for complicated and expensive apparatus. The simple and economical nature of the depositing machine renders it available to the many small bakeries and other users which can not justify the installation and use of more complicated and expensive equipment.

An additional object is to provide a depositing machine which is adaptable to diverse types of foodstuffs, such as pieces of meat and vegetables, jellies, fruits, doughs, viscous liquids, toppings and the like, supplying them to die and molding apparatus for precise shaping and measuring and thereafter depositing the subdivided masses, in a trouble-free continuous manner without sticking, alterations in quantity or dilution or adulteration with foreign materials. These and other objects of the invention will be apparent on reference to the specifications taken in conjunction with the attached drawing representing a preferred embodiment of the invention, in which like parts are identified by like reference characters in each of the views and in which:

Figure 1 is a longitudinal vertical sectional view of a depositing machine, taken on line 1—1 of Figure 2;

Figure 2 is an end elevational view of the machine; and

Figure 3 is a horizontal sectional view of a nozzle for discharging the subdivided masses of foodstuff, taken on line 3—3 of Figure 1.

In a preferred embodiment of the invention, a depositing machine is provided which includes a foodstuff hopper and several underlying members which serve as dies and molds to measure and shape the material. One of the members is movable from a filling position to a depositing position, where means are provided for depositing the subdivided foodstuff.

An important feature of the invention is the provision of roller means in the hopper, for forcing foodstuff into the die or mold openings provided beneath the hopper. The provision of roller means permits the continuous or intermittent supply, as desired, of the foodstuff work material to the hopper, with no need for interruption or cessation of operation in order to refill the hopper. The roller means operate continuously or intermittently, as desired, to force the foodstuff into the openings uniformly and reliably, and constitute simple and economical apparatus for accomplishing the desired objects.

Another important feature is the provision of air jet means registering with the mold opening in a movable member when it is in its depositing position, for depositing the mass present in the mold. By this means, the need for plungers or more complicated or troublesome ejection apparatus is eliminated, there is no need for lubricants or the like, and there is no sticking or variation in the quantities and shapes of the articles or subdivided masses delivered. The air jet means acts to completely eject the mass, clean the openings and preserve the shape and quantity of material delivered through succeeding discharges. The air jet means includes a very simple and surprisingly effective nozzle constructed of a nozzle head and an inner baffle which together form an annular nozzle mouth at the periphery of the mold opening and discharge openings.

In the preferred embodiment illustrated in the drawings, a foodstuff hopper 1 is provided which includes a pair of parallel vertical sides 2 and a pair of outwardly inclined or sloping sides 3. The hopper is mounted on a fixed base plate 4 for the hopper, which is provided with two aligned cylindrical openings of the same dimensions therethrough. One opening constitutes a die opening 5 and is centrally disposed beneath the hopper 1 in communication with the interior of the latter. The other opening in the base plate 4 is an ejection opening 6 which is laterally offset from the hopper along the longitudinal axis and parallel to the die opening 5, for depositing purposes.

A pair of preferably corrugated or knurled cylindrical rollers 7 and 7' or like feeding or filling means are rotatably mounted in the hopper 1, in the vertical side walls 2, so that they extend longitudinally of the machine. The rollers are driven continuously or intermittently from outside of the hopper by conventional means not shown, so that they rotate in opposite directions and towards each other when viewed from the top. The rollers are spaced a short distance above and are centered over the die opening 5 of the base plate 4. The rollers are also spaced a short distance from each other. In this manner, foodstuff which is being continuously or intermittently supplied to the hopper, is drawn between the rollers 7 and 7' and forced into the die opening 5. At the same time, the rollers will slip on the foodstuff therebetween should they tend to deliver the foodstuff at a greater rate than it is taken away and deposited. In this manner, there is no requirement for plunger apparatus and precise fit between the parts, or for correlation and regulation of plunger operations and operations for filling the hopper.

One roller 7' is laterally adjustably mounted for varying the distance between the rollers to accommodate the various types of foodstuffs. This may be accomplished, for example, by providing transverse horizontal slots 7a in the vertical side walls 2 of the hopper, compression spring means 7b seated in a transverse horizontal bore 7c in the side walls 2 and acting to urge the shaft 7d of the adjustable roller 7' outwardly, and an adjusting screw 7e in the bore 7c and acting against the opposite side of the shaft 7d. Other equivalent means for accomplishing the same objects are readily apparent.

The base plate 4 is mounted on a supporting structure or frame 8, including vertical longitudinal side panels 9 and legs or bases 10. The base plate is a rectangular plate of substantial thickness, to provide a die opening 5 and an ejection opening 6 of the same thickness or depth. Below the base plate 4 and also supported by the frame 8 are two plates having the same dimensions as the base plate, which include a longitudinally slidably reciprocatable valve plate 11 adjacent and below the base plate, and a fixed cover plate 12 adjacent and below the valve plate.

The valve plate 11 is mounted for sliding longitudinal reciprocation between the base plate 4 and the cover plate 12, being actuated by an operating arm 13 connected to a suitable apparatus, not shown, for reciprocating the valve plate with suitable timing. The operating arm 13 is pivotally connected to the valve plate 11 by a pin 13a mounted in the bifurcated end of the latter. The valve plate is provided with a mold opening 14 having the same dimensions as the die opening 5 and the ejection opening 6, and the valve plate is reciprocatable from a filling position with the mold opening 14 in register with the die opening 5, as illustrated in broken lines in Figure 1, to a depositing position with the mold opening registered with the ejection opening 6.

For securing proper register in the depositing position, the valve plate 11 may abut on a fixed vertical stop or end plate 15, constituting part of the frame or structure 8. For proper register in the filling position, suitable stop means may be provided on the valve plate 11 and on the frame 8, for example, in the side panels 9. Such a construction is illustrated in Figure 2, which illustrates pins 16 fixed in opposite sides of the valve plate 11, which reciprocate in corresponding longitudinal horizontal slots 17 provided in the side panels 9. This construction is employed to advantage if it is desired to operate the valve plate 11 by hand, and it may also be employed with mechanical operation. The same purpose may be accomplished by regulating the travel of the operating arm 13.

The fixed cover plate 12 is continuous below the die opening 5, forming a cover or closure for the bottom of the mold opening 14 when in its filling position. The cover plate is provided with a depositing or discharge opening 18 in register or alignment with the ejection opening 6, and with the mold opening 14 when in its depositing position. The depositing opening 18 is likewise dimensioned the same as the ejection opening and the mold opening.

The several plates and openings provide means for filling the mold opening 14 with a predetermined quantity of foodstuff in the desired shape, and preserving the shape and quantity from the filling position to the depositing position. While each of the several openings in the embodiment illustrated is identically cylindrical, it will be apparent that they may have other configurations according to the intended purpose. The configuration or contour of each aligned cooperating opening is the same as that of the others, and the respective plate and opening depths or thicknesses are preferably but not necessarily about the same. The several plates contact each other and have sharp edges at the openings, for cleanly separating the molded portion when the valve plate 11 is reciprocated to the discharge position.

The die opening 5 is continuously or intermittently filled with foodstuff by means of the rollers 7 and 7', and when the mold opening 14 is in filling position, the material descends from the die opening to the mold opening, and additional material is forced into the die opening by the rollers. Thus, the material may be firmly packed in the mold opening, and thereabove in the die opening. The space between the rollers, the rotational force, or the rate of rotation may be adjusted to accommodate the foodstuff and to vary the degree of packing in the die and mold openings. One roller may rotate freely, as an idler. When the valve plate travels to depositing position, the molded mass in the mold opening 14 is cleanly and evenly severed from the material in the die opening 5.

Air jet means, generally indicated at 19, are mounted on the base plate 4 adjacent the hopper 1 and in register with the ejection opening 6, and thus with the depositing opening 18 and the mold opening 14 when the latter is in depositing position. The air jet means may include a nozzle 20 connected to a source of air or other gas pressure, not shown, in a closed system by means of a tube or conduit 21.

The nozzle illustrated includes a nozzle head 22 having a circular chamber or space 23 therein communicating with the pressure conduit 21 and registering with the ejection opening 6. The chamber 23 includes an upper frusto-conical zone 24 adjoining an enlarged lower cylindrical zone 25, forming an inwardly projecting ledge 26 therewith. Mounted concentrically in the nozzle head chamber 23 and spaced inwardly from the nozzle head is a circular, generally cylindrical and frusto-conical baffle or block 27, tapering at the top, which forms an annular mouth 28 with the nozzle head. The baffle is supported by the nozzle head by radial pins 28a or the like, which extend through the side of the nozzle head and into the baffle. The cylindrical surface 29 of the baffle has a diameter equal to or greater than that at the corner or edge of the ledge 26, to form the nozzle mouth as a vertically directed annulus.

Air under pressure is supplied through the conduit 21 and issues in the form of a rapid annular jet through the nozzle mouth 28. The baffle 27 projects a short distance vertically downwardly into the ejection opening 6, to insure the formation and maintenance of an annular air jet in the ejection opening, which jet will impinge in substantially the same form on the molded mass in the mold opening 14, to discharge the mass or piece.

There is no need for application of pressure over the remainder of the mass in the mold opening, and it is preferably applied only around the periphery of the opening and the mass therein. Where the mass is not cohesive, as in meat pie fillings, it has been found that only in this way can spewing of the foodstuff be avoided. With masses of this type and more cohesive masses, the thin annular jet deposits a round, flat mass. On the other hand, application of pressure towards the center of the mass causes distortion, if not spreading, of the deposited mass. Of course, masses of lower viscosity and/or cohesiveness have a greater tendency to lose their molded shape once deposited, but shape is not then usually so important, such masses by then ordinarily being confined as in a pie tin or other receptacle.

The application of pressure in a thin peripheral band results in a very sharp and clean separation of the molded mass from the valve plate 11, so that it discharges completely and in the shape desired. The depositing opening 18 serves to confine the piece or mass as it is being ejected, to maintain its form and the direction of ejection, and insure deposition in the proper location below the cover plate 12. In this construction, there is no need for water or other lubricant to prevent sticking of foodstuff to the parts, and there is thus no dilution or adulteration of the foodstuff. No moving parts are required, and there is no maintenance problem.

The foodstuff is deposited through the depositing opening 18 onto the desired apparatus, receptacle or article of food. Thus, the masses may be deposited on a conveyor belt 30 which carries the pieces to other operations. Receptacles, pastry shells, or the like can be placed on the conveyor, so that the foodstuff is deposited therein. Food articles such as cakes, tarts, pies and cookies may be placed on the conveyor or other support and filled, coated, or layered with the material deposited by the machine. The apparatus and method of operating may be employed equally well for a great variety of materials, including chopped meats, vegetables or fruits, confections, doughs or batters, jellies, custards and other dry, sticky, or fluid-like foodstuffs. The quantity of material deposited and the shape of the mass are remarkably uniform for the various foodstuffs.

While an apparatus has been illustrated for depositing one mass, piece or subdivision of the foodstuff at a time, it will be apparent that the invention is adapted for multiple operation, depositing a number of pieces at the same time or in timed relationship. Thus, a row of parallel laterally spaced openings corresponding to each of the openings illustrated may be provided in each plate, and the hopper and the air jet means may be extended or repeated laterally, to deposit as many pieces as desired on a corresponding number of receptacles, conveyors or other articles or apparatus. Several machines can be arranged in series, to perform successive filling, coating or other operations. The machine can be operated in continuous or intermittent fashion, and automatically or semi-automatically. Operations can be timed as desired and adjusted to cooperate with other operations in the bakery or food manufacturing establishment. These and other combinations embodying the invention, and other variations in construction and arrangement of parts may be made while still accomplishing the objects of the invention and falling within its scope.

The invention thus provides a new and improved depositing machine which is versatile and well adapted for commercial foodstuff processing operations, in small as well as large establishments. The machine is very simple and yet remarkably effective in accomplishing its objects. The new combination is especially advantageous in providing cooperative means for filling the molds with measured quantities of material, and completely and evenly discharging and depositing their contents in the desired configuration. The apparatus requirements are simple, and the requirement for moving parts and precise fitting is eliminated to a large extent.

The invention is hereby claimed as follows:

1. In combination in a depositing machine including a slide valve plate having a mold opening arranged for filling with a plastic foodstuff, means for depositing foodstuff from said mold opening comprising an air nozzle head registering with said mold opening when in depositing position, and a baffle in said nozzle head forming an annular nozzle mouth therewith at the periphery of said mold opening.

2. The combination in a depositing machine of a mold having a mold opening arranged for filling with a plastic foodstuff, and air nozzle means for depositing foodstuff from said mold opening comprising an air nozzle head registering with said mold opening when in depositing position, and a baffle in said nozzle head forming an annular nozzle mouth therewith at the periphery of said mold opening.

3. The combination in a depositing machine of a mold plate having a mold opening arranged for filling with a plastic foodstuff, said mold plate being movable from a filling position to a depositing position, a cover plate beneath said mold plate and having an opening registering with said mold opening at its depositing position, and air nozzle means arranged above said mold plate to register with said mold opening when said plate is in said depositing position for depositing foodstuff therefrom, said nozzle means including a device for forming an annular air jet directed through the mold opening upon the upper surface of the foodstuff only at the periphery of said mold opening.

References Cited in the file of this patent
UNITED STATES PATENTS

| | | |
|---|---|---|
| 470,200 | Kiddie | Mar. 8, 1892 |
| 1,460,825 | Peters et al. | July 3, 1923 |
| 2,021,794 | Leone | Nov. 19, 1935 |
| 2,155,952 | Noxon et al. | Apr. 25, 1939 |
| 2,185,174 | Hendler | Jan. 2, 1940 |
| 2,487,271 | Petri | Nov. 8, 1949 |
| 2,530,062 | Holly | Nov. 14, 1950 |
| 2,611,327 | Rudolph | Sept. 23, 1952 |
| 2,664,833 | Armstrong et al. | Jan. 5, 1954 |